3,166,383
METHOD OF TREATING FLUIDIZED PARTICLES WHILE CONVEYED
John M. Morris, Louisville, Ky., assignor, by mesne assignments, to Rex Chainbelt Inc., a corporation of Wisconsin
Continuation of application Ser. No. 629,380, Dec. 19, 1956. This application Mar. 29, 1960, Ser. No. 30,040
4 Claims. (Cl. 34—10)

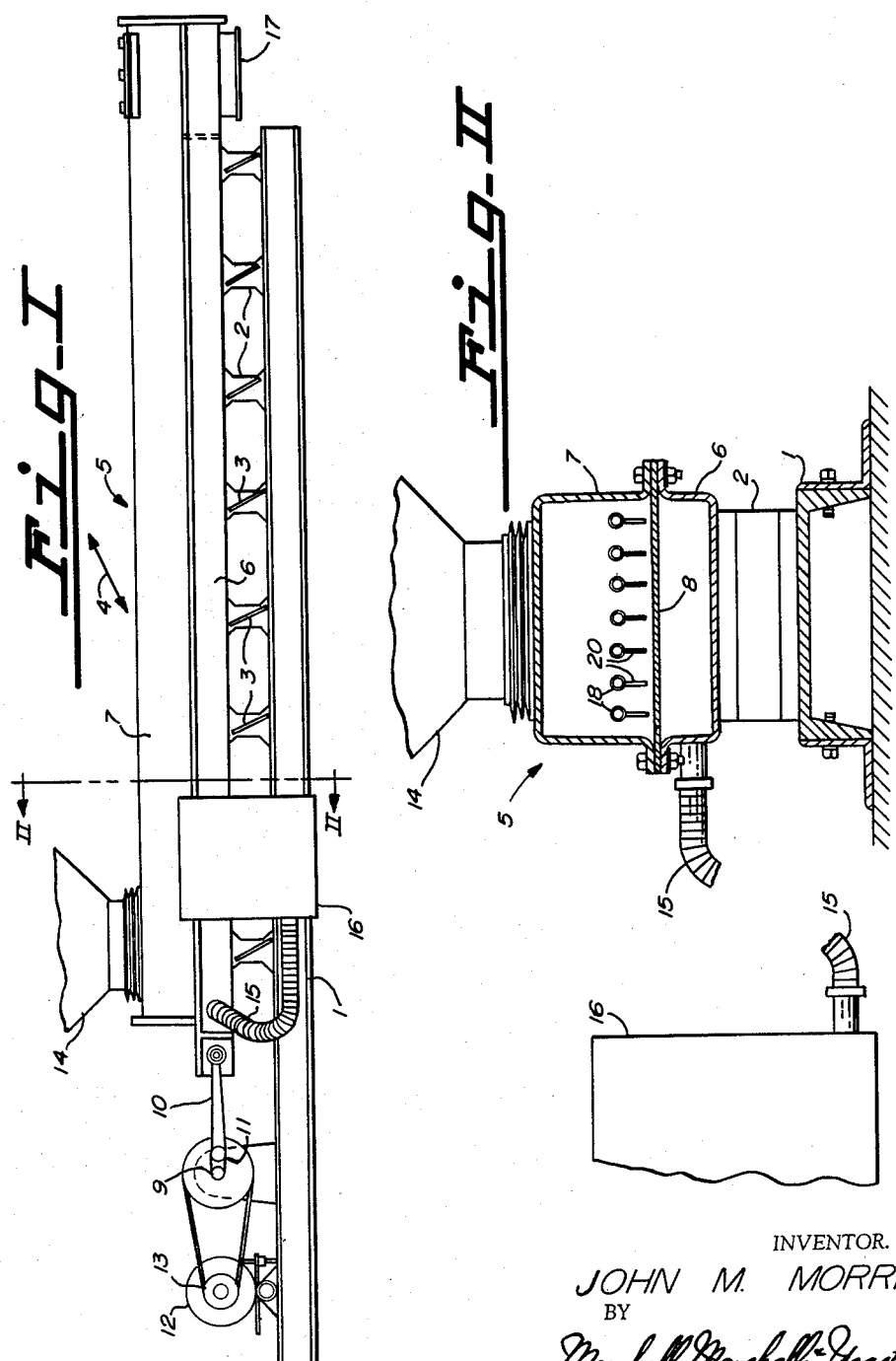

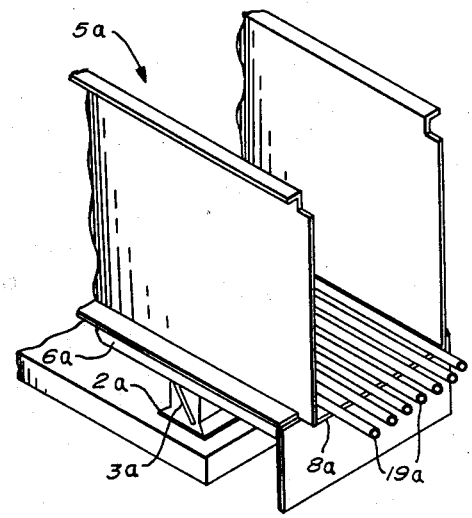
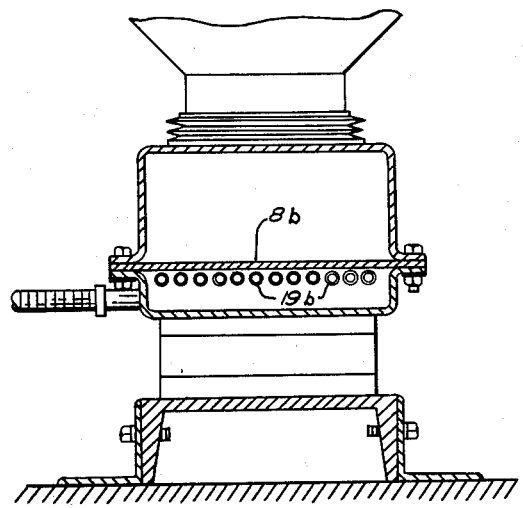

It often is desirable to heat or cool powders for the purpose of promoting or retarding polymerization or other chemical reactions or for driving off adsorbed gases or moisture or otherwise conditioning the powders for further processing or for storage or use.

It is well known that because of the nonheat-conducting properties of masses of pulverulent material, the operation of changing the temperature of such masses is time consuming, and the uniform distribution of a higher or lower temperature through such masses often requires prolonged heat soaking or chilling.

This invention relates to a method and apparatus for not only rapidly and uniformly transferring heat to or from pulverulent material but also conveying such material from one point to another while the heat transfer is occurring, whereby pulverulent material of any average temperature can be continuously received at one point in the apparatus and rapidly heated or cooled while being conveyed to another point where it may be discharged with a higher or lower temperature uniformly distributed throughout the mass.

Finely powdered commodities such as flour, starch, Portland cement, molding powders, pigments and the like cannot be moved in large volumes along a vibratory conveyor which functions by tossing particles upwardly and forwardly, for the reason that particles of fine powder in a relatively thick layer on a vibratory conveyor are held against the vibratory deck of the heretofore existing type of conveyor by atmospheric pressure. The substantially impervious thick layer of powder cannot be tossed along the deck without creating a partial vacuum beneath the layer.

The characteristic of a layer of powder which prevents it from being moved effectively by a vibratory conveyor can be altered by causing a gas such as air to flow upwardly through the layer, thus counteracting the atmospheric pressure above it by relieving the vacuum below it and restoring to the particles individual freedom of movement.

If a mass of powder is aerated to such an extent that it is fluidized, the insulating properties of the mass are greatly reduced and the discreet particles can be readily heated or chilled. Heat can be transferred to or from the discreet particles of a fluidized powder by radiation or conduction. Such heat transfer also is promoted by agitation of particles such as occurs when they are tossed along a vibratory conveyor.

It is an object of this invention to provide means whereby pulverulent materials can be heated or cooled rapidly and uniformly.

It is a further object of this invention to provide means whereby pulverulent materials can be heated or cooled and concurrently conveyed from one point to another.

It is a further object to provide means whereby pulverulent material of any average temperature can be continuously received at one place and heated or cooled to another uniformly distributed temperature while being conveyed to another place.

It is a further object to provide a method and apparatus for heating mixtures of fluidizable fine powders and coarser granules.

It is a further object to provide a method and apparatus whereby fluidizable pulverulent materials, or materials which contain a substantial proportion of particles which if segregated could be fluidized, are moved rapidly and economically from place to place while being rapidly and uniformly heated or cooled.

And it is still a further object of this invention to provide a method and apparatus wherein aeration, vibratory conveying and heat transfer mutually cooperate in processing of pulverulent materials.

Other objects and advantages of the invention will appear upon perusal of the following description, as illustrated by the accompanying drawings in which:

FIG. I is a side elevational view of apparatus embodying one form of the instant invention;

FIG. II is a transverse cross sectional view on a somewhat enlarged scale taken substantially as indicated by the line II—II of FIG. I;

FIG. III is a fragmentary perspective view showing a modified form of the instant invention; and FIG. IV is a transverse cross sectional view similar to FIG. II but showing a further modified form of the invention.

This description and the accompanying drawings are intended to describe and illustrate a preferred form of the instant invention but not to impose limitations upon its scope.

Referring now more particularly to the drawings, and first to FIGS. I and II thereof, the apparatus comprises a base 1 to which transverse resilient supporting and guiding members 2 are secured in longitudinally spaced-apart relation, said members preferably, but not necessarily, comprising rubber or rubber-like blocks having obliquely disposed guiding struts in the form of metal plates or rods 3 molded therein so as to directionally control the relative movement between a conveyor assembly 5 and the base 1 in an inclined path of vibration indicated by the arrow 4. The conveyor assembly 5 is supported on and connected to the tops of said series of resilient members 2.

The resilient members 2 as herein shown are to be regarded as merely illustrative. Numerous other forms thereof, e.g. those that are disclosed in Robert M. Carrier, Jr., United States Patent No. 2,706,112, granted April 12, 1955, may be substituted. Moreover, in some instances, satisfactory results have been obtained with other known forms of resilient mounts such as coil springs or leaf springs extending obliquely between the base 1 and the conveyor assembly 5 (see the disclosures in Robert M. Carrier, Jr., and Maurice G. Whitley, United States Patents Nos. 2,630,210 and 2,630,211, granted March 3, 1953).

In the preferred method of operation, at least one-half of the material by weight is in a completely fluidized state. Under those conditions, the conveyor assembly 5 preferably is inclined slightly so that the fluidized material will flow downhill, the angle of inclination being adjusted to give maximum efficiency. If desired, the conveyor assembly may be helical, as disclosed in Robert M. Carrier, Jr., United States Reissue Patent No. 22,904, granted August 12, 1947.

The conveyor assembly 5 comprises mating opposed channel-shaped parts 6 and 7 which are bolted or otherwise secured together to clamp a porous or semi-permeable deck 8 therebetween.

If desired, struts may be secured at longitudinally spaced intervals transversely across the upper edges of the lower channel-shaped part 6 to rigidify the deck 8 and also to assist in supporting the loads of conveyed material thereon.

Any suitable means may be employed for imparting to the conveyor assembly vibratory movement along the path 4. The vibratory movement-imparting means is shown, by way of example, as comprising an electric motor-driven crank shaft 9 having a rod 10 pivotally connected to the crank 11 of said crank shaft and to the end of the conveyor assembly 5.

The crank shaft 11 is driven by an electric motor 12 which may be of the variable speed type or may be equipped with variable speed pulley and belt transmission mechanism 13.

Other vibratory movement imparting means such as electromagnetic vibrators, revolving eccentric weights or the like are well known in the art and may be substituted for the crank and connecting rod vibratory movement imparting means.

Above one end of the conveyor assembly 5 is a feed hopper 14 for introducing conveyable material upon one end of the deck 8. Connected to the lower channel-shaped part 6 adjacent the feed hopper end of the conveyor assembly 5 is a flexible hose 15 which leads into a chamber formed between the lower channel-shaped part 6 and the deck 8. The said flexible hose 15 communicates at its other end with a unit 16 for supplying a gas such as air under pressure, which may include an air preheater or cooler, as well as a motor-driven blower and volume and pressure controls, all of which are commercially available and none of which are shown in the drawings.

Although the gas to be supplied under pressure through the tube 15 will in most cases be air, other gases may be employed. When the terms "air" and "aeriform fluid" are used in this specification, those terms are intended to mean any suitable aeriform fluid.

As above indicated, the air may be preheated so that it may serve to drive off adsorbed gases or moisture or to promote polymerization or otherwise condition the powder, as well as to aerate or fluidize it. Similarly, the air may be chilled to extract heat from the powder or otherwise condition it.

The form of apparatus shown in FIGS. I and II confines the heated or chilled air within the conveyor assembly 5 until the air reaches a discharge port 17, from whence the air if desired may be recirculated.

Instead of, or in addition to, preheating or cooling the air before it is supplied to the conveyor assembly 5, heat transfer tubes 18 having fins 20 may be located within the upper channel-like part 7 of the conveyor assembly. Heating or cooling tubes 19a as shown in FIG. III, may be employed instead of or in addition to the tubes 18. The tubes may be carried by the vibratory trough assembly 5 as shown in FIG. II, or they may be stationary as indicated in FIG. III. Where heat transfer tubes are employed the particles of powder as they dance along the deck 8 are heated, or cooled, largely by radiation from the tubes or from the particles. In such case it is less important to recirculate the air, and the top of the conveyor assembly 5a may be left uncovered in the manner shown in FIG. III, particularly when the apparatus is designed for cooling.

The resilient supporting members 2a, the plates 3a, the lower channel-shaped part 6a and the deck 8a of the modification shown in FIG. III are similar to the corresponding elements shown in FIGS. I and II.

In the form illustrated by FIG. IV the tubes 19b lie beneath the deck 8b. This arrangement is most efficacious when the deck 8b is of perforated metal and functions as a heat transfer element when it is heated or cooled by the tubes 19b. The tubes in any modification can be stationary or they can vibrate with the conveyor assembly.

It has been possible heretofore to heat powders consisting entirely of fine particles by aerating such powders to a state of complete fluidization and then, by means of pumps, jets, siphons or the like, forcing them to flow over heating coils. The necessity for pumps, jets or siphons is obviated by the present invention, in which the vibratory conveyor not only agitates the stream of material for more efficient heat transfer but also conveys it over such heat transfer units as are employed. Moreover, it conveys mixtures of fine powder and coarse granules or even lumps, which mixtures could not be handled by pumps, jets or siphons.

A vibratory conveyor will not convey a completely fluidized powder uphill, but a completely fluidized powder will flow downhill along a vibratory conveyor. The rate at which a completely fluidized powder will flow along a conveyor depends principally upon the degree of downward slope, though the rate of flow may be somewhat modified by vibratory movement. Coarse granules which cannot be fluidized will not flow freely along a moderately sloping conveyor, but can be conveyed therealong by vibratory movement. By adjusting the slope of the conveyor to convey the fluidized part of an aerated mixture of fine powder and coarse granules at a desired speed and adjusting the vibratory movement of the conveyor to convey the non-fluidized part of the mixture at a desired speed, both parts can be heated or cooled as they flow along together. Indeed, it is possible to make the parts of the mixture move at different speeds and thus subject each of them to heat transfer treatment for a different period of time, to bring each different part to a desired temperature. Thus, where the pulverulent material contains fine fluidizable particles and coarser particles which are non-fluidizable or less readily fluidizable, the volume of air passed through the gas-permeable deck 8 may be so controlled that the fine particles are separated from the coarser particles and fluidized and caused to flow along the conveyor by gravity, while the coarser particles are not fluidized and are caused to form a layer on the deck surface and to be moved therealong by the vibratory motion imparted to the conveyor. In such a case the coarser particles will be moved at a slower rate than the fluidized fine particles and, consequently, will be retained for heat transfer for a longer period of time to enable them to absorb or give up a greater amount of heat, as the case may be.

While the new combination of cooperating aerator, vibratory conveyor and heat transfer elements function most satisfactorily in many situations if the fine powder being processed is aerated to complete fluidization, the new combination functions satisfactorily in other situations even if the fine powder is not completely fluidized.

Broadly stated, this invention provides conveying and temperature changing apparatus for pulverulent material comprising an elongated gas-pervious deck, said deck having a permeability such that there will be substantially no sifting therethrough of the finer particles of the material to be conveyed while providing for the passage therethrough of aeriform fluid, means for causing the flow upwardly through said deck of aeriform fluid at a rate not substantially in excess of that required to fluidize the bed of material to be conveyed, and means for vibrating said deck with a motion such that the work surface of said deck has a vertical acceleration greater than the acceleration due to gravity.

There are certain important factors to be observed in the design, construction and operation of the apparatus of this invention. They are:

(1) The nature of the materials to be processed,
(2) The initial and final temperature of the material,
(3) The degree of aeration of the material,
(4) The nature of the permeable deck of the conveyor, and
(5) The nature of the vibratory motion of the conveyor deck.

When the term "fluidize" is used in this description and in the claims, it is intended to refer to a condition in which aeriform fluid passes upwardly through a mass of fine powder at such a rate that the particles of the mass assume limited motion without being entrained in the fluid; as distinguished from conditions wherein the particles have a velocity which approaches that of the air stream and thus may become entrained in such stream.

(1) THE NATURE OF THE MATERIAL TO BE PROCESSED

It is necessary only that the material to be conveyed and heated or cooled contain a substantial proportion of particles which, when segregated and arranged in a bed as, for example, 4" thick, can be fluidized by aeration from beneath. Thus the material may consist entirely of such particles or it may contain only a substantial proportion of such particles.

When a nonaerated admixture of fine particles and heavier and larger particles is subjected to the action of a vibratory conveyor, the tendency is for the material to stratify with the finer particles in the lower layer adjacent the conveyor deck; and to the extent that such stratification occurs, it interferes with the heat ransfer and with efficient operation of the vibratory conveyor.

When the deck of the vibratory conveyor is made permeable and a uniform blanket of air is caused to flow upwardly therethrough, then the order of stratification is reversed, depending upon the nature and quantity of the fine material and the degree of aeration. Any substantial amount of aeration, however, will thus reverse the stratification and carry the fine material to the upper portion of the layer so that the larger non-fluidizable heavier particles are in contact with the permeable deck of the vibratory conveyor, and they are moved along by an action which is apparently similar to that which occurs when such heavier non-fluidizable material is by itself conveyed on a vibratory conveyor having an impermeable deck. The ratio of surface area to mass of the larger particles is much less than the ratio of area to mass of the fine particles. However, such heat as is absorbed at the surface of a larger particle is readily diffused throughout the particle by conduction.

When the material to be conveyed consists of a mixture of coarse granules with particles which can be fluidized, the use of a vibratory conveyor with a permeable deck, whereby the material thereon may be aerated, makes possible conveyance and heat treatment of such material which cannot be conveyed or heat treated effectively by use of either a vibratory conveyor by itself or a slide conveyor which relies entirely on aeration.

(2) THE INITIAL AND FINAL TEMPERATURES OF THE MATERIAL

The material in some cases may enter the apparatus at room temperature, e.g. 70°–80° F., and be heated for the purpose of promoting polymerization or other chemical change to any desired degree below the point where decomposition or charring occurs. The optimum final temperature will vary with the material and the result desired. In other cases the material may be received hot and be cooled rapidly to some desirable lower temperature. Many materials such as thermosetting molding compositions and adhesives are required to be stored and sometimes shipped under refrigeration. Such materials when processed by the apparatus of this invention may be received warm or hot and be rapidly chilled to refrigeration temperatures for storage or shipment.

(3) THE DEGREE OF AERATION OF THE MATERIAL

Generally, in the practice of this invention, a lesser volume of air is required to fluidize the agitated material than in those cases where agitation is not employed. The degree of aeration should be insufficient to entrain the particles but at least sufficient to loosen the mass.

When a mixture of material is conveyed which contains a substantial proportion of material which is not fluidizable, the degree of aeration may be that which would be required to fluidize that portion of the mass which is fluidizable if it were segregated and separately aerated. The practical upper maximum for any material is, of course, that degree of fluidization at which some of the finer particles begin to be entrained in the air stream.

(4) THE NATURE OF THE PERMEABLE DECK OF THE CONVEYOR

The primary requisite of the permeable deck is that it be capable of transmitting upwardly therethrough a substantially uniform blanket of air, in relatively low volume per unit of area, without permitting the sifting downwardly through the deck of any substantial proportion of the fines of the material. Stated in another way, the deck must not permit the sifting therethrough of any substantial proportion of the work but must be capable of transmitting a uniform blanket of air which breaks the vacuum between the body of material to be treated and the upper surface of the deck and counterbalances the atmospheric pressure upon the upper surface of the material.

The deck may be made of a wide variety of materials. Closely woven fabrics such as those used in conveyors relying entirely on aeration may be employed satisfactorily, provided that they have the desired permeability and are able to withstand the temperature of the material being conveyed. When higher temperatures are encountered, inorganic materials are, of course, preferred. Thus, the deck may be formed of porous stone slabs or metal plates or screens having a mesh or opening size such as to provide a permeability factor within the ranges given above.

When the deck consists of a metal screen, an electrical current can be passed through the screen so that the screen serves as a heating element.

When a foraminous plate or screen is used, the individual openings must be sufficiently small so that there will be no local areas of intense velocity which would cause geysering of the material on the deck.

When reference is made to the maintenance of a uniform supply of aerating fluid, by this is meant the maintenance of that condition in any local area of the deck, although it should be noted that the volume and velocity of the supply may be different in different longitudinal or transverse areas of the deck.

(5) THE NATURE OF THE VIBRATORY MOTION

The path of movement of an incremental deck area may be along a straight line or along a closed orbit. Whatever the form of the path, it should have a substantial vertical component and a substantial horizontal component.

The frequency and amplitude of the vibrations may be varied over rather wide limits, provided, however, that the relation of the frequency to the amplitude of the stroke is such that an incremental area of the active surface of the deck has a vertical acceleration which is at least equal to and preferably greater than the acceleration of gravity. For practical purposes, when handling most materials, the vertical acceleration of an incremental area of the deck should lie within the range of from 1.5 to 3.0 times the acceleration of gravity.

The thickness of the layer to be maintained on the permeable deck for maximum efficiency depends on a variety of factors, mostly related to the characteristics of the material to be conveyed and, of course, the degree of slope of the deck. Ordinarily, for most materials, a layer thickness of more than 1" and preferably about 4" will give satisfactory results. The layer thickness can be regulated in a vibratory conveying apparatus by regulating the rate of feed thereto, and in a feeder type of apparatus the layer thickness can be regulated by varying the distance between the deck and the opening of the hopper.

In many cases, all other conditions being the same, the speed at which the layer of material is conveyed increases, within limits, with an increase in the thickness of the layer.

The adjustment in layer thickness for maximum speed of operation can be made readily for each installation when handling a specific type of material by merely observing that thickness which will give maximum velocity of movement forwardly on the conveying deck. The adjustment of the layer thickness should be coordinated with an adjustment of the volume of air caused to move upwardly through the permeable deck and with an adjustment of the rate of heating or cooling. These three factors are so interrelated that it is impossible to give a universally applicable formula. Moreover, the varying characteristics of the different materials would require various formulae for various materials.

The following are specific examples of this invention:

*Example 1*

A conveyor constructed as illustrated in FIG. I, 10 ft. long and having a porous deck width of 12" with the plates 3 arranged at an angle of about 30° from the vertical, vibrated with an amplitude of 3/16" at a frequency of 900 cycles per minute, will convey ground fluorspar having a fineless of 100% at −50 mesh and 50% at −200 mesh and a density of about 85 lbs. per cu. ft., at a rate of more than 15 tons per hour. Air admitted at a temperature of 200° F., supplemented by heating by means of the tubes 18, will reduce the moisture content of the fluorspar from 9% to 3%. The conveying deck was substantially horizontal.

*Example 2*

A conveyor like that used in Example 1 but having an 8" wide deck, vibrated at 3/8" stroke and a frequency of 480 cycles per minute, conveyed Portland cement dust of −250 mesh at a rate of about 45 ft. per minute, equal to about 15 tons per hour, the tendency of the dust to absorb moisture being counteracted by preheating the air supplied through the porous deck.

*Example 3*

A conveyor like that used in Example 1, vibrated at a stroke of 3/8" and a frequency of 825 cycles per minute, conveyed phosphate fertilizer dust of −250 mesh at a greater rate than the cement dust was conveyed in Example 2.

In all of the foregoing examples, the porous deck was a canvas membrane having a pressure drop of about 1.5 lbs. per square inch when passing air at the rate of 10 cu. ft. per minute per square foot, and an air flow just sufficient to fluidize the material, ranging up to about 10 cu. ft. per minute per square foot was used.

The apparatus of this invention has been used successfully in processing a synthetic detergent under such atmospheric conditions that the material partially agglomerated, which would have made it impossible to process the material on a conveyor relying entirely on aeration.

This is a continuation of my copending application Serial No. 629,380, filed December 19, 1956, now abandoned, which is a continuation-in-part of application Serial No. 547,073, filed November 16, 1955, entitled "Method and Apparatus for Conveying Pulverulent Material," which has matured into Patent No. 2,795,318.

The invention described above is subject to modification within the spirit and scope of the invention as disclosed.

Having described the invention, I claim:

1. A method of changing the temperature of material containing a substantial proportion of fluidizable fine particles, while conveying the material along a conveyor deck, comprising the steps of (a) maintaining only part of the material in a gas-fluidized phase above the deck by passing a gas upwardly through the material at a rate sufficient to fluidize only part of the material and insufficient to produce substantial entrainment of such material, (b) causing said gas-fluidized phase to flow along the deck, (c) conveying the remainder of the material along the deck by vibrating the deck in a controlled path of motion having a substantial vertical component and a substantial horizontal component, (d) subjecting the material to heat exchange, said material containing a substantial proportion of relatively coarse particles, and (e) regulating the relative rates of flow of the gas fluidized phase and the vibratorily conveyed material such that the fluidized phase and the coarser particles reach a discharge point on the deck at the same time they have attained a predetermined temperature.

2. A method of changing the temperature of material containing a substantial proportion of fluidizable fine particles, while conveying the material along a conveyor deck, comprising the steps of (a) maintaining only part of the material in a gas-fluidized phase above the deck by passing a gas upwardly through the material at a rate sufficient to fluidize only part of the material and insufficient to produce substantial entrainment of such material, (b) causing said gas-fluidized phase to flow along the deck, (c) conveying the remainder of the material along the deck by vibrating the deck in a controlled path of motion having a substantial vertical component and a substantial horizontal component, and (d) subjecting the material to heat exchange.

3. A method of changing the temperature of material containing a substantial proportion of fluidizable fine particles, while conveying the material along a conveyor deck, comprising the steps of (a) maintaining only part of the material in a gas-fluidized phase above the deck by passing a gas upwardly through the material at a rate sufficient to fluidize only part of the material and insufficient to produce substantial entrainment of such material; (b) causing said gas-fluidized phase to flow along the deck; (c) conveying the remainder of the material along the deck by vibrating the deck in a controlled path of motion having substantial vertical and horizontal components; and (d) subjecting the material to heat exchange, said fluidizable material being in contact with a heat exchange surface.

4. A method of changing the temperature of material containing a substantial proportion of fluidizable fine particles, while conveying the material along a conveyor deck, comprising the steps of (a) maintaining only part of the material in a gas-fluidized phase above the deck by passing a gas upwardly through the material at a rate sufficient to fluidize only part of the material and insufficient to produce substantial entrainment of such material, (b) causing said gas-fluidized phase to flow along the deck, (c) conveying the remainder of the material along the deck by vibrating the deck in a controlled path of motion having substantial vertical and horizontal components, (d) subjecting the material to heat exchange, said material containing a substantial proportion of relatively coarse particles, and (e) regulating the relative rates of flow of the gas-fluidized phase and the vibratorily conveyed material to control the relative rates of heat exchange, said fluidizable material being in contact with a heat exchange surface.

References Cited in the file of this patent

UNITED STATES PATENTS

| | | |
|---|---|---|
| 693,455 | Stanley | Feb. 18, 1902 |
| 1,068,162 | Payne | July 22, 1913 |
| 2,014,249 | Fletcher | Sept. 10, 1935 |
| 2,094,786 | Flint | Oct. 5, 1937 |
| 2,358,293 | Kendall et al. | Sept. 12, 1944 |
| 2,629,938 | Montgomery | Mar. 3, 1953 |
| 2,795,318 | Morris | June 11, 1957 |
| 2,876,557 | Ducatteau | Mar. 10, 1959 |

FOREIGN PATENTS

| | | |
|---|---|---|
| 725,266 | Great Britain | Mar. 2, 1955 |